United States Patent Office 3,498,945
Patented Mar. 3, 1970

3,498,945
LINEAR ORGANOPOLYSILOXANES THEIR PREPARATION AND THEIR USE
Marcel Lefort, Caluire, Rhone, and Parasko Nicou, Lyon, France, assignors to Rhone-Poulenc S.A., Paris, France, a corporation of France
No Drawing. Filed Aug. 7, 1967, Ser. No. 658,591
Claims priority, application France, Aug. 16, 1966, 73,149
Int. Cl. C08g *31/22, 47/06*
U.S. Cl. 260—37    10 Claims

ABSTRACT OF THE DISCLOSURE

The invention provides novel linear organopolysiloxanes having a viscosity of 1 to 25 million centipoises at 25° C. and containing vinyl groups, which can be converted into vulcanised elastomers by heating with an organopolysiloxane containing Si-H bonds and a platinum catalyst.

---

The present invention relates to linear organopolysiloxanes having unsaturated hydrocarbon radicals, their preparation and their use.

Various types of linear organopolysiloxanes which, in addition to saturated or aromatic radicals, also possess unsaturated aliphatic radicals such as allyl and vinyl have already been described.

Thus French patent specification No. 927,641 and its first addition No. 54,771 describe, in a general way, polysiloxanes which simultaneously contain methyl groups and vinyl groups, and more particularly, in addition No. 54,771, rubbers containing a small proportion (0.18% to 5% of the total number of organic substituents) of vinyl radicals statistically distributed along the polysiloxane chain. In order to prepare these rubbers, a mixture of dimethyldichlorosilane and methylvinyldichlorosilane may be hydrolysed and the siloxanes obtained then polymerised in the presence of sulphuric acid or ferric chloride hexahydrate.

French patent specification No. 1,132,048 shows that in the preparation of silicone rubbers, and copolymerisation with organic olefines products having different properties are obtained when linear polysiloxanes having a vinyl group at each end of the polysiloxane chain are used. Such organopolysiloxanes may be obtained by polymerisation of cyclic siloxanes with a vinyldiorganosilanol or a divinyldisiloxane in the presence of an alkali metal hydroxide.

Finally, it has been proposed, in French patent specification No. 1,166,405, to prepare linear organopolysiloxanes containing vinyl radicals, first on each of the silicon atoms at the ends of the chain and secondly on some of the silicon atoms situated along the polysiloxane chain. Such compounds may be prepared by copolymerising cyclic polysiloxanes one of which contains vinyl radicals and a divinyldisiloxane in the presence of an alkali metal silanolate.

The present invention provides the linear organopolysiloxanes having a viscosity of 1 million to 25 million centipoises at 25° C. and having the average formula:

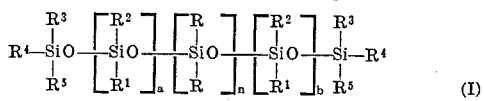    (I)

wherein the symbols $R^1$ are the same or different and represent substituted or unsubstituted vinyl radicals, the symbols $R^2$ are the same or different and represent saturated aliphatic, saturated alicyclic, or aromatic hydrocarbon radicals, the symbols R are the same or different and represent hydrogen or saturated aliphatic, saturated alicyclic or aromatic hydrocarbon radicals, not more than a proportion of the symbols R representing hydrogen, the symbols $R^3$, $R^4$ and $R^5$ are the same or different and represent substituted or unsubstituted vinyl radicals, or saturated aliphatic, saturated alicyclic, or aromatic hydrocarbon radicals, $n$ is an integer from 2,500 to 10,000, and $a$ and $b$ are each 0 or integers such that $a+b$ is not more than 15, $a$ or $b$ only being 0 when at least one of the symbols $R^3$, $R^4$ and $R^5$ at the same end of the polymer chain is a substituted or unsubstituted vinyl radical.

The various radicals may carry substituents provided these are compatible with the reactions used for the preparation of the compounds of Formula I described below. It must be understood that when some of the symbols R represent a hydrogen atom, their proportion in the organopolysiloxane rubbers of Formula I is preferably a minor one, generally below 10%.

$R^2$ may in particular represent alkyl, such as methyl, ethyl, propyl or butyl, an alicyclic saturated radical with 5 or 6 nuclear carbon atoms such as cyclopentyl, methylcyclopentyl, cyclohexyl or methylcyclohexyl, an aryl radical, in particular phenyl and phenyl substituted by lower alkyl such as methyl, ethyl or propyl as in the tolyl, xylyl or cumenyl, or an aralkyl radical, in particular a phenylalkyl radical such as benzyl or phenylethyl. Preferably, in Formula I, R, $R^2$, $R^3$ and $R^4$ are each methyl or phenyl, $R^1$ and $R^5$ are vinyl, $a+b$ is 3 to 8, and the ratio $$\frac{\text{number of vinyl radicals}}{\text{number of silicon atoms}}$$

is 1:500 to 1:1000.

The present invention also provides a process for the preparation of the organopolysiloxanes of Formula I, which comprises copolymerising, in the presence of a catalyst, one or more cyclic organopolysiloxanes consisting of units of formula

    (II)

and one or more vinylpolysiloxanes of the formula:

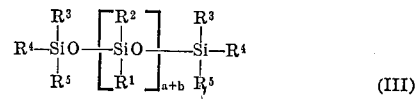    (III)

in which the various symbols are as hereinbefore defined.

The cyclic organopolysiloxanes of Formula II may be either a homopolymer or a copolymer corresponding to a definite formula, or a mixture of homopolymers or copolymers or also a mixture of homopolymers and copolymers. Amongst these cyclic siloxanes, those which contain 3 to 8 cyclic silicon atoms are particularly advantageous to use. Hexamethylcyclotrisiloxane, octamethylcyclotetrasiloxane, decamethylcyclopentasiloxane, dodecamethylcyclohexasiloxane, tetramethyltetraphenylcyclotetrasiloxane, hexaphenylcyclotrisiloxane, octaphenyl cyclotetrasiloxane, 1,3,5 - trimethylcyclotrisiloxane, 1,3,5,7-tetramethylcyclotetrasiloxane, 1,3,5,7,9 - pentamethylcyclopentasiloxane and 1,3,5 - triphenylcyclotrisiloxane are all suitable.

The vinylpolysiloxanes of Formula III act as chain stoppers, whilst introducing monovalent groups of the formulae:

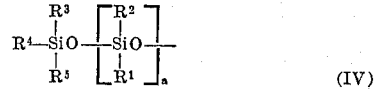    (IV)

and

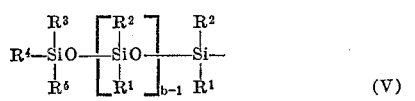

These vinylpolysiloxanes may be prepared for example by the usual process of cohydrolysis of a difunctional vinylsilane of formula:

with a monofuctional silane of formula:

in which Y represents a hydrolysable atom or functional group, for example a chlorine atom, or an acyloxy or amino group. It is also possible to isolate a difunctional vinylpolysiloxane of formula:

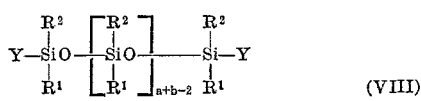

in a first stage by controlled hydrolysis of a compound of formula VI and then to condense it only with a monofunctional compound of Formula VII. This condensation may be a cohydrolysis or, where the derivatives of Formulae VI and VII are chlorosilanes, a reaction with a weakly alkaline reagent such as sodium bicarbonate in an inert diluent such as an aromatic hydrocarbon.

The copolymerisation process of the cyclic organopolysiloxane and the compound of Formula III may be carried out by heating the reagents for several hours at a moderate temperature and in the presence of a catalyst. An alkaline reagent may be used as the catalyst if the constituents of the mixture to be copolymerised do not contain an Si-H bond. Suitable alkaline reagents are the alkali metal hydroxides, tetraalkylammonium hydroxides, and the alkali metal silanolates. A diorganosilyl sulphate may also be used as the catalyst; such a catalyst has the advantage of being soluble in the medium which is to be polymerised and of making it possible to work equally well with organopolysiloxanes containing Si-H bonds as with organopolysiloxanes which are free of such bonds. The proportion of catalyst can vary within quite wide limits; amounts of the order of 0.01 to 1% based on the total weight of organopolysiloxanes employed are generally very suitable. Amongst the diorganosilyl sulphates which can be used, dimethylsilyl sulphate is preferred, it can easily be obtained from dimethyldichlorosilane and sulphuric acid, for example according to the process described by Schmidt and Schmidbaur [Ber. 93 878 (1960)].

The temperature at which the copolymerisation process can be carried out depends on the catalyst used. With a diorganosilyl sulphate it may be between 20° and 150° C., preferably between 60° and 95° C., and with alkaline catalysts it may be between 120° and 250° C., preferably between 150° and 220° C.

In practice, the copolymerisation may be carried out in the following manner: the mixture of the organopolysiloxanes to be copolymerised is introduced into the reaction vessel followed by the catalyst, and the mixture is stirred to homogenise it. It is then heated until its viscosity remains constant. The mixture of organopolysiloxanes may also be preheated before introducing the catalyst.

The products obtained may then be neutralised with a suitably chosen reagent; for example, if the catalyst is a diorganosilyl sulphate, the neutralisation may be effected with a metallic oxide such as aluminum oxide, zinc oxide, magnesium oxide or a compound such as ammonium carbonate. When using a basic catalyst the neutralisation may advantageously be carried out with phosphoric acid or finely divided silica. It is also possible to use an excess of an organosilyl sulphate and then to neutralise the excess with metallic oxide such as zinc oxide. The neutralised product may then be treated to remove volatile constituents, for example by heating for several hours in vacuo or in a stream of an inert gas, at a temperature of 150° to 200° C. The low molecular weight polysiloxanes are removed in this way.

The new organopolysiloxane rubbers of Formula I can be used for various purposes. They may be copolymerised with unsauturated compounds having at least one vinyl group such as dienes, vinyl esters or acrylic derivaties. They can also be introduced into compositions intended for various applications such as water repellency and anti-adhesion treatments. The rubbers may also be converted into organosilicon elastomers by reaction with an organic peroxide or an appropriate organosilicon crosslinking agent.

The organopolysiloxanes of Formula I which are free of Si-H bonds can be converted into elastomers by cross-linking them with an organohydrogenopolysiloxane in the presence of a platinum catalyst. The elastomers so obtained have excellent mechanical properties, superior to those of elastomers obtained by crosslinking previously known organopolysiloxane rubbers having vinyl groups.

The organohydrogenopolysiloxane used may be a cyclopolysiloxane but is preferably a linear polysiloxane having at least two hydrogen atoms directly bonded to silicon atoms per molecule and with a viscosity which may range from that of a disiloxane up to about 2500 cst. at 25°. Amongst these, it is advantageous to use α,ω-dihydrogenoorganopolysiloxanes of the formula:

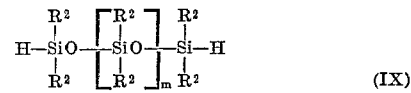

in which the symbols $R^2$ are as hereinbefore defined and $m$ is an integer which may vary within quite wide limits depending on the viscosity of the rubber used. Values of $m$ of between 10 and 500 are generally very suitable. These hydrogenopolysiloxanes are well known and may, for example, be prepared by equilibration of cyclotetrasiloxanes $[(R^2)_2SiO]_4$ and 1,3-dihydrogenodisiloxanes $[H(R^2)_2]_2O$ under the influence of an acid catalyst or by telomerisation of $[(R^2)_2SiO]_4$ with $HSi(R^2)_2Cl$ in the presence of ferric chloride hexahydrate, followed by hydrolysis. It is also possible to isolate the dichloropolysiloxane of the formula:

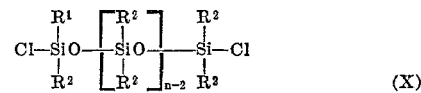

in a first stage by telomerisation of $[(R^2)_2SiO]_4$ with $(R^2)_2SiCl_2$ and then to condense it with the chlorohydrogenosilane $H(R^2)_2SiCl$ according to one of the methods set out above for obtaining the compounds of Formula III.

The amounts of dihydrogenopolysiloxane of Formula IX used can vary within quite wide limits depending on the vinyl group content of the rubber used and the molecular weight of the dihydrogenopolysiloxane. However in order to obtain elastomers with excellent properties it is desirable first that the number of vinyl groups introduced by the rubber should be quite close to and preferably identical with the number of Si-H bonds contained in the compound of Formula IX and secondly that the number of vinyl groups in the rubber used should be such that the ratio $$\frac{\text{number of vinyl groups}}{\text{number of silicon atoms}}$$

assumes a value from 1/500 to 1/1000. In practice, the proportion by weight of the compound of Formula IX is generally between 0.5% and 25% based on the weight of the rubber employed.

Various forms of divided platinum deposited on various carriers (asbestos, alumina, charcoal or silica) as well as platinum compounds such as chloroplatinic acid or platinum-olefine complexes, may be used as the catalyst. The amount of catalyst is not critical; in practice, amounts of the order of 0.05 to 5 mg. of platinum per 29 g. of SiH groups are very suitable.

During the preparation of the elastomers, fillers may be incorporated which are inert towards the reagents employed and have no tendency to inhibit the addition reaction of the SiH bonds to the vinyl groups. Suitable fillers include reinforcing fillers such as silicas of combustion and silica aerogels of large surface area, which may themselves optionally be treated with an organosilicon derivative. Apart from these reinforcing fillers, it is also possible to use ground crude silicas, ground quartz, alumina, titanium oxide, calcium carbonate, graphite, carbon black, polyvinyl chloride and cork powder. If desired, it is also possible to incorporate organopolysiloxanes which are free of reactive groups or to add pigments and other products appropriate to the use for which the elastomer is intended.

From the various ingredients enumerated above compositions may be prepared by the usual mixing techniques used in the organosilicon rubber and elastomer industry. A stabiliser such as benzotriazole or triphenylphosphine may be added to these compositions which may thus be kept as such for a certain time without undergoing a change.

These compositions, including the stabilised compositions referred to, may be converted into elastomers by heating at a temperature of the order of 100° to 220° for a period of several minutes to a few hours. It is often advantageous to follow this period of heating by a heat treatment at 200–250° C. in order to give the elastomers good heat stability at temperatures above 200° C.

As has been mentioned above, these elastomers have excellent mechanical properties as well as good heat stability. They can be used for various applications such as the manufacture of tubes, hoses and joints.

The following examples illustrate the invention. Temperatures are in degrees centigrade.

EXAMPLE 1

1,104 g. of octamethylcyclotetrasiloxane are introduced into a cylindrical borosilicate glass apparatus of capacity 1,500 cm.³ (diameter: 10.5 cm.; height: 20 cm.) fitted with a stirrer system, a tube for introducing dry nitrogen and a collecting condenser connected to a receptacle cooled by a stream of cold water, and are dehydrated by progressive heating to 172° with stirring under a stream of nitrogen at a flow rate of 60 l./h. After one and a half hours, the water and 20 cm.³ of octamethylcyclotetrasiloxane have been carried over. The contents of the vessel are cooled to 145° and during the cooling the following samples are taken: first, 60 cm.³ with which the absence of moisture and of acidity are confirmed; and secondly, 50 cm.³ in which 0.77 cm.³ of a 10% solution of a potassium silanolate, containing 13% by weight of KOH, in octamethylcyclotetrasiloxane are dissolved. This silanolate is obtained from tetradecamethylhexasiloxane and potassium hydroxide followed by dehydration. 0.8 g. of a methylvinylheptasiloxane of formula

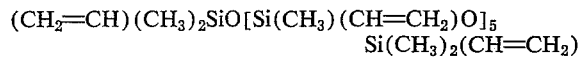

are then added to the product remaining in the cylindrical reactor, followed by the silanolate solution prepared as described above.

The mixture is polymerised by heating with stirring for 2 and a half hours at 145°, followed by 1 and a half hours at 190°, and 1 hour at 210°. Carbon dioxide is then introduced at the rate of 60 l./h. for 5 minutes, and the mixture stirred for 15 minutes under an atmosphere of carbon dioxide. The rubber so obtained (1,030 g.) is, after cooling, malaxated for 1 hour with 1.3 cm.³ of octamethylcyclotetrasiloxane containing 0.03 g. of dimethylsilyl sulphate. 1.1 g. of zinc oxide are added and the mixture malaxated for a further hour at 25°. Finally, the volatile fractions are removed at 200° for 6 hours in a stream of nitrogen supplied at the rate of 150 l./h. In this way 873 g. of a rubber, having methyl and vinyl groups and a viscosity of 22.5 million centipoises at 25°, are obtained. The ratio of the number of vinyl groups to the total number of silicon atoms is 1/1,400.

The methylvinylheptasiloxane used in this example is prepared in the following manner. A controlled hydrolysis of methylvinyldichlorosilane (705 g.) in diethyl ether (750 cm.³) is carried out by adding 72 g. of water dissolved in 70 cm.³ of dioxane, and the 1,9-dichloromethylvinylpentasiloxane of formula:

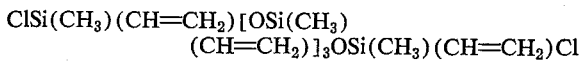

is isolated by distillation (B.P.=90°) (0.4 mm. Hg.). 26.5 g. of dimethylvinylchlorosilane are added to 48.5 g. of the latter, followed by 250 cm.³ of toluene, and the resulting solution is progressively introduced into a mixture of 40.5 g. of sodium bicarbonate and 50 cm.³ of toluene which is stirred and kept close to 0°. After adding water and decanting, 45 g. of methylvinylheptasiloxane of formula:

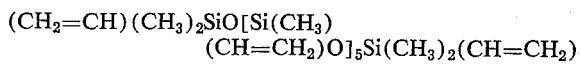

are isolated by distillation. This material has the following constants: B.P.=127°–128°/0.4 mm. Hg, $n_D^{20}$=1.4350, and $d_4^{20}$=0.9482.

EXAMPLE 2

The procedure described in Example 1 is followed with 1,152 g. of octamethylcyclotetrasiloxane and using 1.15 g. of a chain stopper consisting of methylvinylpentasiloxane of formula:

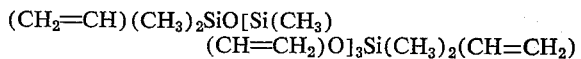

After stabilization with carbon dioxide gas, the rubber is malaxated with 10 g. of precipitated silicia, first for 1 hour in the cold and then for 7 hours at 200° under a stream of nitrogen supplied at the rate of 150 l./h. 910 g. of a rubber, having a viscosity of 13 million centipoises at 25° and with a ratio of the number of vinyl groups to the total number of silicon atoms of 1/1,000, are finally obtained.

The methylvinylpentasiloxane used in this Example is prepared by controlled hydrolysis of methylvinylchlorosilane with the amount of water corresponding to the formation of 1, -dichloromethylvinyltrisiloxane of formula:

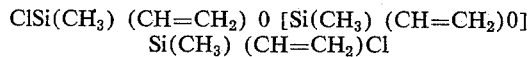

followed by cohydrolysing the latter (313 g.) with dimethylvinylchlorosilane (241 g.). This pentasiloxane has the following constants: B.P.=85°–86°/0.3 mm. Hg., $n_D^{20}$=1.4309, and $d_4^{20}$=0.9262.

EXAMPLE 3

The technique described in Example 1 is followed, starting with 1,104 g. of octamethylcyclotetrasiloxane and 1.6 g. of methylvinylheptasiloxane identical to that used in Example 1. 895 g. of a rubber, having a viscosity of 9.5 million centipoises at 25° and with a ratio of the number of vinyl groups to the total number of silicon atoms of 1/700, are obtained.

50 g. of silicon of combustion treated with octamethylcyclotetrasiloxane, 0.875 g. of an α,ω-dihydroxylated dimethylpolysiloxane oil containing 10% by weight of hydroxyl groups, 0.875 g. of a dimethyl(tetramethylethylenedioxy)silane of formula:

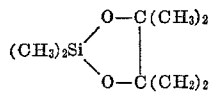

0.2 cm.³ of a solution containing 1% by weight of chloroplatinic acid in isopropanol, and 3.52 g. of an α,ω-dihydrogeno-dimethylpolysiloxane oil of average formula:

$$H[Si(CH_3)_2O]_{56}Si(CH_3)_2H$$

having a viscosity of 120 cst. at 20° and a weight content of hydrogen directly bonded to silicon of 0.048%, are incorporated into 100 g. of this rubber on a two-roll mill.

The resulting paste is then placed in flat moulds 1.9 mm. in depth and heated at 125° under a pressure of 150 kg./cm.² for 20 minutes, followed by 3 hours at 120° in a ventilated atmosphere. Elastic sheets are thus obtained which are stabilised by heating for 16 hours either at 150° or at 200° or at 250°. Samples of unstabilised and stabilised sheets were subjected to various mechanical strength tests, namely:

Shore hardness (ASTM Standard D 676–49 T); tensile strength (AFNOR Standard T 46,002-dumb-bells $H_3$); elongation, percent (AFNOR Standard T 46,002, dumb-bells $H_3$); and tear strength (ASTM Standard D 624–49 T, Sample "A").

The following table summarises the results obtained after heat stabilisation (a), after heating at 150° for 16 hours (b), after heating at 200° for 16 hours (c), and after heating at 250° for 16 hours (d).

|   | Shore hardness | Tensile strength, kg./cm.² | Elongation, percent | Tear strength, kg./cm. |
|---|---|---|---|---|
| a | 55 | 94 | 976 | 44.6 |
| b | 59 | 108.5 | 883 | 41 |
| c | 62 | 111.5 | 805 | 36.2 |
| d | 64 | 81 | 615 | 31 |

The α,ω-dihydrogenated dimethylpolysiloxane used in the preparation of the elastomer was obtained in the following manner:

(a) First, 592 g. of octamethylcyclotetrasiloxane and 17.2 g. of dimethyl dichlorosilane are telomerised in the presence of 6 g. of anhydrous ferric chloride by heating at 200° for 5 hours in an autoclave. After cooling, the mass is filtered and volatile products are stripped by heating at 150° under a pressure of 0.5 mm. Hg. There remain 553 g. of α,ω-dichloro-dimethylpolysiloxane to which the following average formula may be attributed from determination of the chlorine content:

$$ClSi(CH_3)_2 O[Si(CH_3)_2]_{59} OSi(CH_3)_2 Cl$$

200 g. of this polysiloxane are then condensed with 10 g. of dimethylchlorosilane in 350 cm.³ of toluene in the presence of 20 g. of sodium bicarbonate, following the technique indicated for the preparation of the methylvinylheptasiloxane used in Example 1. The process is completed by removing the volatile products by heating at 140° under a pressure of 0.5 mm. Hg.

EXAMPLE 4

Working as in Example 2, but with 1,104 g. of octamethylcyclotetrasiloxane and 1.65 g. of methylvinylpentasiloxane identical to that used in Example 2, 900 g. of a rubber are obtained whose viscosity is 10.5 million centipoises at 25° and in which the ratio of the number of vinyl groups to the total number of silicon atoms is 1/500.

EXAMPLE 5

1,104 g. of octamethylcyclotetrasiloxane are dehydrated in the manner indicated in Example 1 and the treatments indicated are carried out. 150 g. of octaphenylcyclotetrasiloxane and then the solution of silanolate are added to the siloxane remaining in the cylindrical vessel and the mixture is heated at 150° for 1 hour and then at 180° for 2 hours. 1.6 g. of the methylvinylheptasiloxane used in Example 1 are then introduced and the mixture is polymerised by heating at 200° for one and a half hours and then at 215° for 1 hour 20 minutes. After the carbon dioxide treatment indicated in Example 1, 600 g. of the resulting rubber are malaxated for 2 hours with 0.75 cm.³ of octamethylcyclotetrasiloxane containing 0.03 g. of dimethylsilyl sulphate. The neutralisation is completed as in Example 1, using 0.65 g. of zinc oxide. Finally 534.5 g. of a rubber having methyl, phenyl and vinyl groups and having a viscosity of 11 million centipoises at 25° are obtained. The ratio of the number of vinyl groups to the total number of silicon atoms is 1/700.

An elastomer is prepared from 100 g. of this rubber by the process and with the ingredients indicated in Example 3. The mechanical properties of the resulting elastomer are summarised in the following table (the symbols a, b, c and d have the same significance as in Example 3).

|   | Shore hardness | Tensile strength, kg./cm.² | Elongation, percent | Tear strength, kg./cm. |
|---|---|---|---|---|
| a | 57 | 100.9 | 1,138 | 45.7 |
| b | 61 | 114.3 | 876 | 41.2 |
| c | 66 | 112.7 | 778 | 37.5 |
| d | 71 | 89.2 | 501 | 31 |

We claim:

1. Linear organopolysiloxanes having a viscosity of 1 million to 25 million centipoises at 25° C. and having the average formula:

wherein the symbols $R^1$ are the same or different and represent substituted or unsubstituted vinyl radicals, the symbols $R^2$ are the same or different and represent alkyl of 1 to 4 carbon atoms, an alicyclic saturated radical of 5 or 6 ring carbon atoms, unsubstituted or substituted by methyl, phenyl, phenyl substituted by lower alkyl, benzyl, or phenylethyl, the symbols R are the same or different and represent hydrogen, alkyl of 1 to 4 carbon atoms, an alicyclic saturated radical of 5 or 6 ring carbon atoms, unsubsttiuted or substituted by methyl, phenyl, phenyl substituted by lower alkyl, benzyl, or phenylethyl, at least some of the symbols R being other than hydrogen, the symbols $R^3$, $R^4$ and $R^5$ are the same or different and represent substituted or unsubstituted vinyl radicals, or alkyl of 1 to 4 carbon atoms, an alicyclic saturated radical of 5 or 6 ring carbon atoms, unsubstituted or substituted by methyl, phenyl, phenyl substituted by lower alkyl, benzyl, or phenylethyl, n is an integer from 2500 to 10,000, and a and b are each 0 or integers such that a+b is not more than 15, a or b only being 0 when at least one of the symbols $R^3$, $R^4$ and $R^5$ at the same end of the polymer chain is a substituted or unsubstituted vinyl radical.

2. Linear organopolysiloxanes according to claim 1 in which R, $R^2$, $R^3$ and $R^4$ are each methyl or phenyl, $R^1$ and $R^5$ are vinyl, a+b is 3 to 8, and the ratio $$\frac{\text{number of vinyl radicals}}{\text{number of silicon atoms}}$$

is 1:500 to 1:1000.

3. Process for the preparation of a linear organopolysiloxane having a viscosity of 1 million to 25 million centipoises at 25° C. and having the average formula:

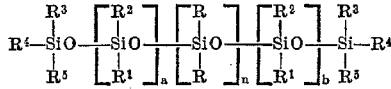

wherein the symbols $R^1$ are the same or different and represent substituted or unsubstituted vinyl radicals, the symobls $R^2$ are the same or different and represent alkyl of 1 to 4 carbon atoms, an alicyclic saturated radical of 5 or 6 ring carbon atoms, unsubstituted or substituted by methyl, phenyl, phenyl substituted by lower alkyl, benzyl, or phenylethyl, the symbols R are the same or different and represent hydrogen, alkyl of 1 to 4 carbon atoms, an alicyclic saturated radical of 5 or 6 ring carbon atoms, unsubstituted or substituted by methyl, phenyl, phenyl substituted by lower alkyl, benzyl, or phenylethyl, at least some of the symbols R being other than hydrogen, the symbols $R^3$, $R^4$ and $R^5$ are the same or different and represent substituted or unsubstituted vinyl radicals, or alkyl of 1 to 4 carbon atoms, an alicyclic saturated radical of 5 or 6 ring carbon atoms, unsubstituted or substituted by methyl, phenyl, phenyl substituted by lower alkyl, benzyl, or phenylethyl, $n$ is an integer from 2500 to 10,000, and $a$ and $b$ are each 0 or integers such that $a+b$ is not more than 15, $a$ or $b$ only being 0 when at least one of the symbols $R^3$, $R^4$ and $R^5$ at the same end of the polymer chain is a substituted or unsubstituted vinyl radical, which comprises copolymerising, in the presence of a catalyst, one or more cyclic organopolysiloxanes consisting of units of the formula:

and one or more vinylpolysiloxanes of the formula:

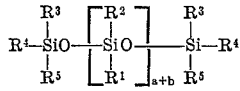

in which the various symbols are as hereinbefore defined.

4. Process according to claim 3 in which the catalyst is an alkali metal hydroxide, a tetraalkyl ammonium hydroxide, an alkali metal silanolate, or a diorganosilyl sulphate.

5. A vulcanisable organopolysiloxane composition which comprises a linear organopolysiloxane having a viscosity of 1 million to 25 million centipoises at 25° C. and having the average formula:

wherein the symbols $R^1$ are the same or different and represent substituted or unsubstituted vinyl radicals, the symbols $R^2$ are the same or different and represent alkyl of 1 to 4 carbon atoms, an alicyclic saturated radical of 5 or 6 ring carbon atoms, unsubstituted or substituted by methyl, phenyl, phenyl substituted by lower alkyl, benzyl, or phenylethyl, the symbols R are the same or different and represent alkyl or 1 to 4 carbon atoms, an alicyclic saturated radical of 5 or 6 ring carbon atoms, unsubstituted or substituted by methyl, phenyl, phenyl substituted by lower alkyl, benzyl, or phenylethyl, the symbols $R^3$, $R^4$ and $R^5$ are the same or different and represent substituted or unsubstituted vinyl radicals, or alkyl of 1 to 4 carbon atoms, an alicyclic saturated radical of 5 or 6 ring carbon atoms, unsubstituted or substituted by methyl, phenyl, phenyl substituted by lower alkyl, benzyl, or phenylethyl, $n$ is an integer from 2500 to 10,000, and $a$ and $b$ are each 0 or integers such that $a+b$ is not more than 15, $a$ or $b$ only being 0 when at least one of the symbols $R^3$, $R^4$ and $R^5$ at the same end of the polymer chain is a substituted or unsubstituted vinyl radical, an organopolysiloxane of viscosity less than 2500 centistokes at 25° C. and containing Si-H bonds, and a platinum catalyst.

6. A composition according to claim 5 in which the organopolysiloxane containing Si-H bonds is an α,ω-dihydrogenopolydimethylsiloxane having 10 to 500 silicon atoms per molecule.

7. A composition according to claim 5 in which the proportion of the organopolysiloxane containing Si-H bonds is 0.5 to 25% by weight of the organopolysiloxane.

8. A composition according to claim 5 in which the proportion of platinum catalyst is 0.05 to 5 mg. of Pt per 29 g. of Si-H groups in the organopolysiloxane containing them.

9. A composition according to claim 5 which also comprises silica of combustion as filler.

10. Vulcanised elastomers produced by heating at 100° C. to 220° C. a composition as defined in claim 5.

References Cited

UNITED STATES PATENTS 2,867,599   1/1959   Hurd et al.
3,159,601   12/1964  Ashby.
3,192,175   6/1965   Russell.
3,341,490   9/1967   Burdick et al.

MORRIS LIEBMAN, Primary Examiner

L. T. JACOBS, Assistant Examiner

U.S. Cl. X.R.

260—46.5